US010825153B2

(12) United States Patent
Yokota et al.

(10) Patent No.: US 10,825,153 B2
(45) Date of Patent: Nov. 3, 2020

(54) IMAGE PROCESSING APPARATUS, DISPLAY APPARATUS, AND IMAGE PROCESSING METHOD

(71) Applicant: Sony Interactive Entertainment Inc., Tokyo (JP)

(72) Inventors: Kenichiro Yokota, Tokyo (JP); Hiroshi Mikami, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 71 days.

(21) Appl. No.: 16/157,327

(22) Filed: Oct. 11, 2018

(65) Prior Publication Data
US 2019/0139203 A1    May 9, 2019

(30) Foreign Application Priority Data

Nov. 6, 2017 (JP) ................................. 2017-213720

(51) Int. Cl.
*G06T 5/00* (2006.01)
*G09G 5/10* (2006.01)
(52) U.S. Cl.
CPC .............. *G06T 5/009* (2013.01); *G06T 5/007* (2013.01); *G09G 5/10* (2013.01); *G06T 2207/10016* (2013.01); *G06T 2207/20208* (2013.01); *G09G 2320/0626* (2013.01)
(58) Field of Classification Search
None
See application file for complete search history.

(56) References Cited

U.S. PATENT DOCUMENTS

2016/0292834 A1* 10/2016 Tsuru ....................... G06T 5/009
2016/0358346 A1* 12/2016 Hendry ................. H04N 1/6088

FOREIGN PATENT DOCUMENTS

| JP | 2004-054250 A | 2/2004 |
| JP | 2006-173671 A | 6/2006 |
| JP | 2008-085634 A | 4/2008 |
| JP | 2016-058848 A | 4/2016 |
| JP | 2016-213809 A | 12/2016 |
| JP | 2017-085481 A | 5/2017 |
| JP | 2017-139511 A | 8/2017 |
| JP | 2017-167402 A | 9/2017 |

(Continued)

OTHER PUBLICATIONS

Japanese Office Action dated Oct. 1, 2019 for the Corresponding Japanese Patent Application No. 2017-213720.

*Primary Examiner* — Michelle Chin
(74) *Attorney, Agent, or Firm* — Katten Muchin Rosenman LLP

(57) ABSTRACT

Disclosed herein is an image processing apparatus including: an image data acquisition section configured to acquire data of an image; a luminance conversion section configured to convert a luminance range composing a pixel value of the image so as to correspond to the luminance range capable of an output as a display image; and an output section configured to output the data of the image in which a luminance after the conversion is defined as the pixel value. The luminance conversion section acquires information regarding a linear luminance range capable of an output in the luminance that is proportional to a setting luminance in a display and determines a conversion rule at least on a basis of the information.

11 Claims, 8 Drawing Sheets

(56) References Cited

FOREIGN PATENT DOCUMENTS

| | | |
|---|---|---|
| JP | 2017-169221 A | 9/2017 |
| JP | 2017-181668 A | 10/2017 |
| JP | 2017-184253 A | 10/2017 |
| WO | 2015/198554 A1 | 12/2015 |

* cited by examiner

IMAGE PROCESSING APPARATUS, DISPLAY APPARATUS, AND IMAGE PROCESSING METHOD

BACKGROUND

The present disclosure relates to an image processing apparatus that allows an image to be displayed on a display and an image processing method executed by the image processing apparatus.

In the past, various techniques for improving image quality have been developed in a video display of television broadcasting, a distributed moving image, or the like. In recent years, in addition to a technique for improving a resolution or a color region, a technique for processing a signal of an HDR (High Dynamic Range) obtained by enlarging a luminance range becomes popular. The HDR is approximately one hundred times as large as an existing SDR (Standard Dynamic Range) in a tolerance of a luminance. Therefore, an object such that a user feels dazzling in a real world such as reflection of sun light can be more really represented even in the image. Not only in the television broadcasting or the distributed moving image but also in a world of a computer graphics such as a game image, a virtual world can be made to have a feeling of presence more by using representation in the HDR (see, Japanese Patent Laid-open No. 2016-58848, for example).

SUMMARY

Even if a dynamic image representation is implemented by using a wide luminance space to the full extent, it is difficult to faithfully reproduce a world-view of an original image or an intention of an image creator, in some cases, due to signal processing or the like up to a luminance range capable of an output or display of a display unit that displays the image. For example, in a case where the luminance range to which the display can correspond is smaller than the luminance range given to the original image, a conversion such that gradation of the luminance is compressed in a high-luminance area is generally performed.

In the result, even if an object is drawn in detail in a bright location in the image or the sky, etc., a certain quantity of information is lost and the object may not be viewed by the user in some cases. Further, a luminance of each pixel in the actually displayed image is changed depending on a control method, a luminance distribution in the image, a light emitting time of elements, etc. inside a display apparatus. Therefore, even if the image as data is the same, ease of viewing is also considered to be changed in accordance with factors of the above.

The present disclosure has been made in view of the above-mentioned circumstances and there is a need for the present disclosure to provide a technique capable of stably displaying an intended image representation on a display.

One embodiment of the present disclosure relates to an image processing apparatus. The image processing apparatus includes: an image data acquisition section configured to acquire data of an image; a luminance conversion section configured to convert a luminance range composing a pixel value of the image so as to correspond to the luminance range capable of an output as a display image; and an output section configured to output the data of the image in which a luminance after the conversion is defined as the pixel value. The luminance conversion section acquires information regarding a linear luminance range capable of an output in the luminance that is proportional to a setting luminance in a display and determines a conversion rule at least on the basis of the information.

Another embodiment of the present disclosure relates to a display apparatus. The display apparatus includes: a characteristic output section configured to output information regarding a linear luminance range capable of an output in a luminance that is proportional to a setting luminance in a display; an image data acquisition section configured to acquire data of an image in which a luminance range composing a pixel value of the image is converted under a conversion rule based on the linear luminance range; and a display section configured to display the image.

Still another embodiment of the present disclosure relates to an image processing apparatus. The image processing apparatus includes: an image data acquisition section configured to acquire data of an image; and an output section configured to acquire information regarding a luminance range of a control target against the image, which ought to fall within a linear luminance range capable of an output in a luminance that is proportional to a setting luminance in a display apparatus and associate information regarding the acquired luminance range and the data of the image to be output to the display apparatus.

Still another embodiment of the present disclosure relates to an image processing method. The image processing method includes: acquiring data of an image; converting a luminance range composing a pixel value of the image so as to correspond to the luminance range capable of an output as a display image; and outputting the data of the image in which a luminance after the conversion is defined as the pixel value. The converting acquires information regarding a linear luminance range capable of an output in the luminance that is proportional to a setting luminance in a display and determines a conversion rule at least on the basis of the information.

It is to be noted that also arbitrary combinations of the components described above and conversions of the representation of the present disclosure between a method, an apparatus, a system, a computer program, a recording medium in which the computer program is recorded and so forth are effective as modes of the present disclosure.

According to the present disclosure, an intended image representation can be stably displayed on a display.

DETAILED DESCRIPTION OF THE PREFERRED EMBODIMENT

Figure 1:
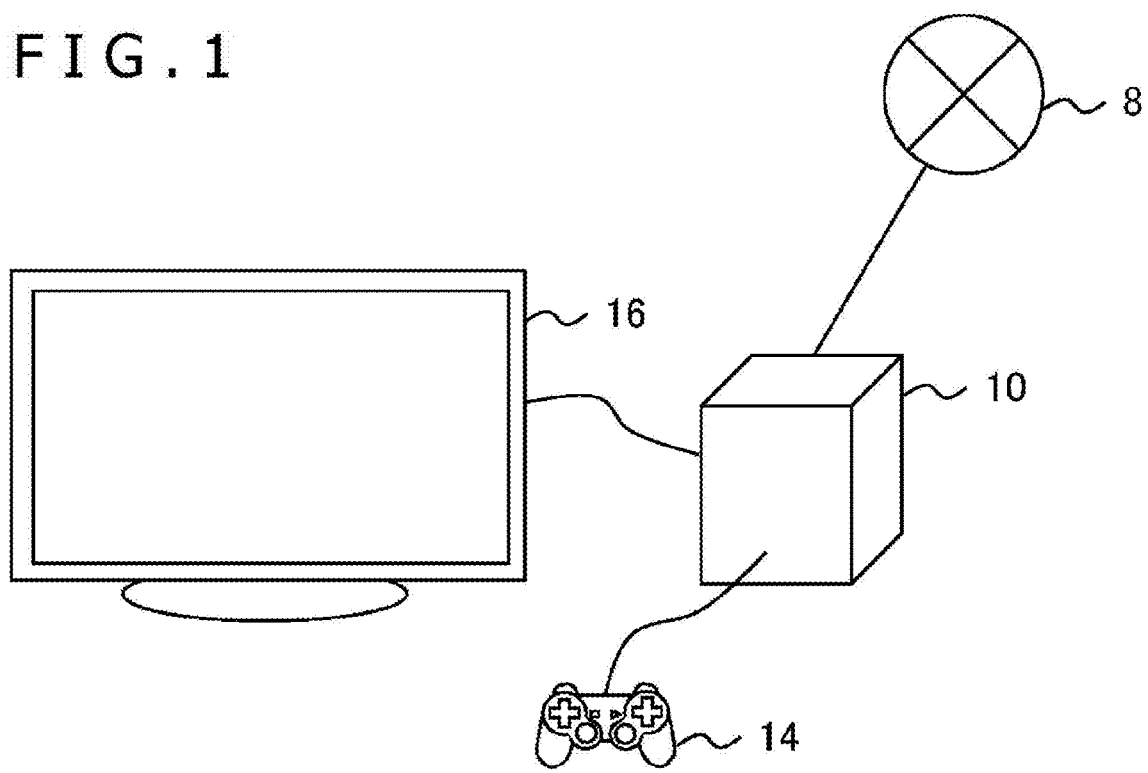
FIG. 1 is a diagram illustrating a configuration example of an image processing system according to the present embodiment.

FIG. 1 illustrates a configuration example of an image processing system according to the present embodiment. The image processing system includes an image processing apparatus 10, an input apparatus 14, and a display apparatus 16. As illustrated in the figure, the image processing apparatus 10 may be connected to a server, etc. that provide various contents through a network 8 such as the Internet. The input apparatus 14 may be any one of an image pickup apparatus that photographs a real world, a microphone that acquires a voice, a sensor that detects various physical values, or a combination thereof in addition to a general input apparatus capable of a user operation such as a controller, a keyboard, a mouse, a joystick, and a touch pad.

The display apparatus 16 is implemented by a liquid crystal display, plasma display, organic EL (Electroluminescence) display, or the like that displays an image. In addition, the display apparatus 16 may be equipped with a speaker that outputs a voice. The input apparatus 14 and the display apparatus 16 may be connected to the image processing apparatus 10 through a wireline cable or may be wireless-connected to the image processing apparatus 10 through a wireless LAN (Local Area Network) or the like. Further, appearance shapes of the input apparatus 14, the display apparatus 16, and the image processing apparatus 10 are not limited to those illustrated in the figure. For example, two or more of them may be integrally formed.

The image processing apparatus 10 receives a signal according to the user operation from the input apparatus. Further, the image processing apparatus 10 performs processing according to the above and generates data of a display image to output the data to the display apparatus 16. The image processing apparatus 10 may be any of a game machine, a personal computer, a tablet terminal, a mobile terminal, a mobile-phone, and the like. Contents of the processing performed by the image processing apparatus 10 may be various in accordance with such a shape of the image processing apparatus 10, application or contents selected by the user, or the like.

For example, the image processing apparatus 10 progresses an electronic game specified by the user in accordance with the user operation and draws and outputs data of a game screen at a predetermined frame rate. Alternatively, the image processing apparatus 10 may acquire a data stream of a moving image from the server through the network 8 and sequentially decode and output the data stream. Data of the moving image stored in a recording medium may be read out and sequentially decoded and output. Hereinafter, drawing by the image processing apparatus 10 itself and decoding of image data generated by other apparatuses are generically referred to as "generation" of the image by using the image processing apparatus 10.

In such a configuration, the image processing apparatus 10 generates, for example, an image that represents a luminance of each color in each pixel in a 16-bit floating point. Further, the image processing apparatus 10 quantizes the image and thereby transmits the image to the display apparatus 16 as an electric signal of 10 bit, etc. The display apparatus 16 returns the electric signal to the luminance by using inverse-quantization. Further, the display apparatus 16 converts the luminance into a voltage and drives a display panel to thereby output the image. Here, a luminance range capable of an output is various depending on the display apparatus 16. Therefore, a wide luminance range represented by the original image is subjected to conversion processing of the luminance for falling within the luminance range capable of an output, that is, tone mapping.

Figure 2:
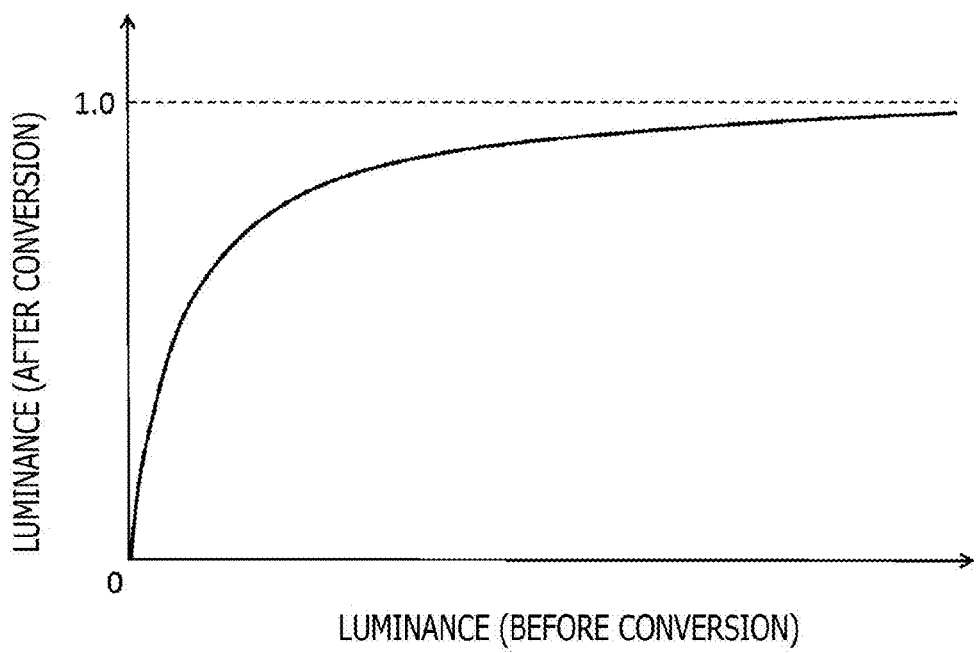
FIG. 2 is a diagram illustrating a conversion function used by tone mapping in the past.

FIG. 2 illustrates a conversion function (hereinafter, referred to as a "tone curve") used by the tone mapping in the past. The same figure illustrates a Reinhard function that is a typical tone curve. The Reinhard function implements a conversion such that as the luminance is more directed from a low-luminance area to a high-luminance area side, gradation is more suppressed in view of visual characteristics of human being. Thereby, even if the luminance range is represented by any display apparatus, an influence to an appearance due to compression of the luminance range can be reduced. Further, such a tone curve is determined in view of an average luminance of the original image. Thereby, an intermediate portion of the compressed luminance range and consequently a general separation between the low-luminance area and the high-luminance area can be adjusted in accordance with brightness of the entire image.

Figure 3:
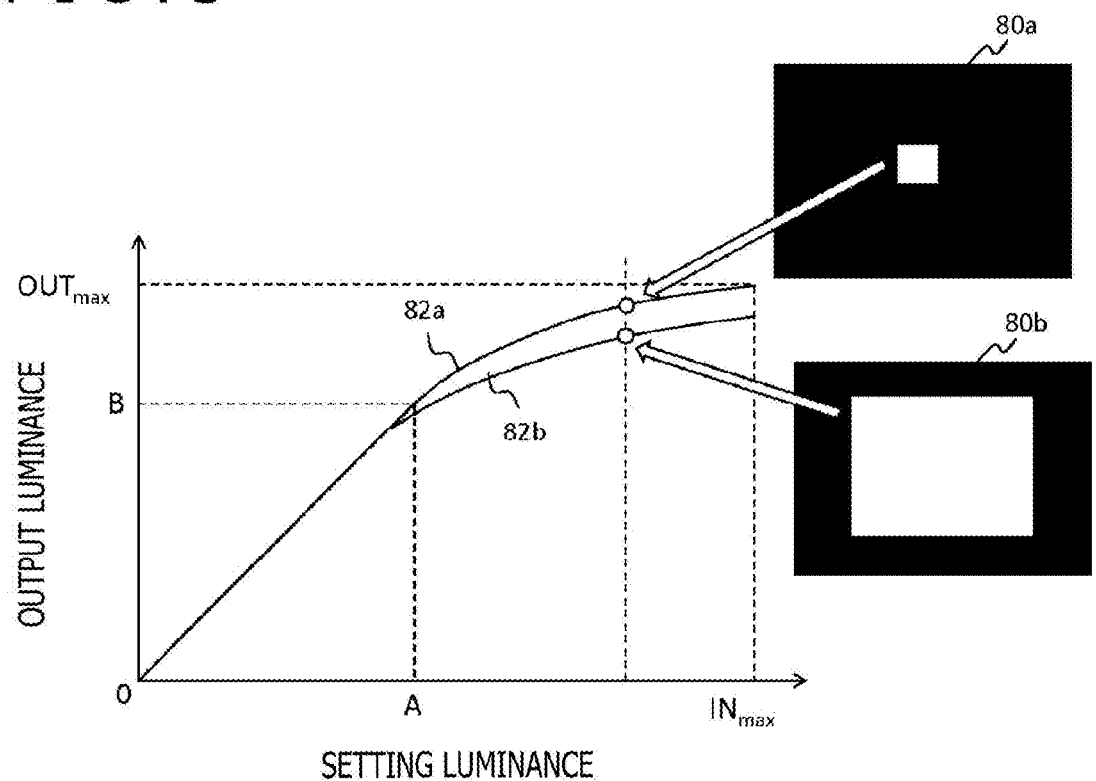
FIG. 3 is a diagram illustrating luminance characteristics of a display apparatus according to the present embodiment.

On the other hand, in such tone mapping, as a location in the image is brighter, detailed representation given by the original image is more easily lost by the compression of the gradation. The fact may be caused even by characteristics of output luminance in the display apparatus 16. FIG. 3 illustrates the luminance characteristics of the display apparatus 16. In a graph on the left side of the same figure, a horizontal axis represents the luminance (setting luminance) after the conversion caused by the tone mapping. Further, a vertical axis represents the output luminance at the time of emitting an element of the display on the basis of the luminance after the conversion.

In the case of the tone curve illustrated in FIG. 2, a maximum value 1.0 in setting of the luminance after the conversion corresponds to a maximum value IN max of the setting luminance illustrated in FIG. 3. An output luminance OUT max caused by the maximum value IN max is a maximum output luminance of the display apparatus 16. The output luminance is, of course, monotonously increased responsive to a change from the minimum value up to the maximum value IN max of the setting luminance. However, as indicated in luminance characteristics 82a and 82b, gradients of the above are not constant in many cases. Specifically, the output luminance at the same level of gradation is assured against the setting luminance up to a certain level of luminance from the minimum value. When the setting luminance is larger than the above setting luminance, a change in the output luminance is apt to be suppressed.

Specifically, as illustrated in the figure, the luminance characteristics are obtained such that a linear relationship between the setting luminance and the output luminance is held in the setting luminance that is equal to or smaller than a predetermined luminance A and the gradient becomes eventually smaller in an area in which the setting luminance is larger than the predetermined luminance A with the predetermined luminance A being defined as a boundary. Further, a general display apparatus controls the brightness in the display in accordance with a luminance distribution of the image, so that power consumption does not exceeds a prescribed value. Therefore, like images 80*a* and 80*b* illustrated in the right side of the same figure, even if the image has an area with the same level of high luminance, the luminance characteristics 82*a* of the image 80*a* in which an area is small is compared with the luminance characteristics 82*b* of the image 80*b* in which an area is large and the output luminance becomes high at the high-luminance area.

Further, the display apparatus such as a liquid crystal having a backlight has characteristics in which the luminance increases along with rise in temperature of the backlight. Therefore, the characteristics of the output luminance are varied even by a time from light emission. As described above, in the high-luminance area, particularly, even if the setting luminance is the same, the really output luminance becomes various due to control, etc. inside the display apparatus. In the result, in visibility of a detailed portion represented by the original image, as the image is represented with higher luminance, the visibility becomes more unstable depending on the display apparatus or conditions. Thereby, in a match-up game, for example, when an enemy object that exists in a bright location of the visual space is easily viewed or hardly viewed depending on the display apparatus for use in the game, the above becomes problematic in relation to fairness of the game itself.

Figure 4A:
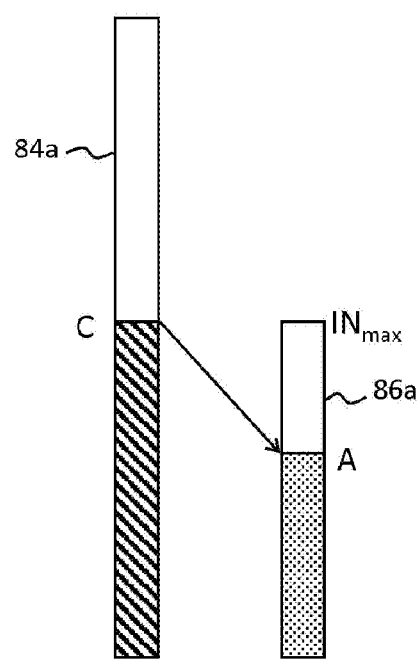
FIGS. 4A and 4B are diagrams conceptually illustrating a luminance conversion according to the present embodiment.
Figure 4B:
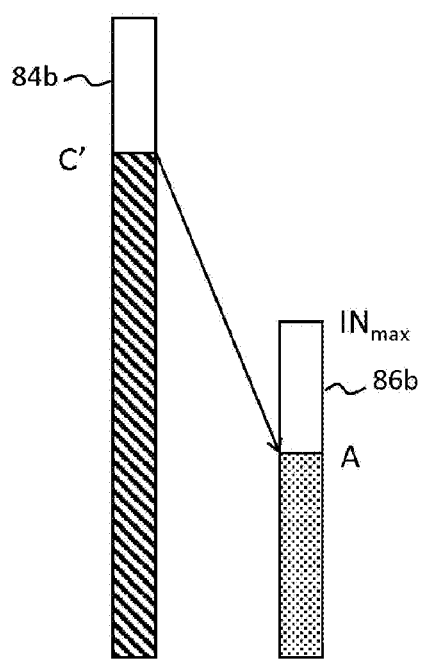

To solve the above problem, in the image processing apparatus 10 according to the present embodiment, a conversion rule in the tone mapping is adjusted in accordance with both of characteristics regarding the representation in the image like the above-described enemy object and the luminance characteristics of the display apparatus. FIGS. 4A and 4B illustrate the luminance conversion according to the present embodiment on a conceptual basis. FIGS. 4A and 4B illustrate, with a height of a rectangle, luminance ranges 84*a* and 84*b* before the conversion and luminance ranges 86*a* and 86*b* after the conversion through the tone mapping. Note that a unit of the luminance range before and after the conversion is not particularly limited, and therefore even a scale of the luminance range illustrated in the figure is absolutely illustrative.

Further, either of the luminance ranges 86*a* and 86*b* after the conversion corresponds to the range of the "setting luminance" illustrated in FIG. 3. The maximum luminance capable of setting is defined as IN max and the maximum range is defined as A in the luminance range (hereinafter, referred to as a "linear luminance range") having a linear relationship between the setting luminance and the output luminance. The maximum luminance A depends on the display apparatus and at the same time may depend on even the luminance distribution in the image or the time in some cases. The FIG. 4A illustrates a case in which like the enemy object, a target desired to maintain, even in the display, a detail degree given to the original image falls within a relatively intermediate luminance range. Further, the FIG. 4B illustrates a case in which such a target is represented at relatively high luminance.

In an example of the above-described match-up game, even in the same virtual space such as the interior of a room, the FIG. 4A corresponds to a case in which the enemy object exists in a location not directly exposed to sunlight. Further, the FIG. 4B corresponds to a case in which the enemy object moves to a location directly exposed to sunlight, such as at the window. When there is no large difference in both as the luminance distribution of the entire image, a uniform luminance conversion is performed regardless of a position of the enemy object in accordance with the general tone mapping described above. In the result, the enemy object in the image of the FIG. 4B belongs to the high-luminance area and the gradation is compressed and at the same time the output luminance is easily changed depending on the display apparatus.

In the present embodiment, like the enemy object, the maximum luminances C and C' are acquired from among the luminance ranges in the representation (hereinafter, referred to as a "control luminance range") of the target in which the side in which the image is proposed is considered to maintain the detail degree and the visuality. The tone curve is determined so that the maximum luminances C and C' are typically converted into the maximum luminance A from among the linear luminance ranges of the display apparatus. Thereby, even if the luminance in the representation of the target moves to the high-luminance side, it can escape from the compression of the gradation. At the same time, the luminance can be attained so as not to belong to the high-luminance area that the output luminance depends on the display apparatus or conditions, when possible. In the result, representation of key points or damage of the visuality is suppressed while respecting an original image world.

Note that the control luminance range and the linear luminance range just have to be approximately associated with each other and both of the maximum luminances need not be strictly associated with each other. For example, both of the luminances in which a predetermined amount of margin is added to the maximum luminance may be associated with each other and the maximum luminance itself may be used as an approximate value such as a time average. Further, a luminance given to each color of a RGB (Red, Green and Blue) as a pixel value is mainly assumed as the "luminance" according to the present embodiment. The luminance can be replaced with a pixel value in the case in which a RGB image is converted into an image having different attributes such as a luminance image and a color difference image, or can be replaced with coordinates in the color space represented by a combination of the luminance of a RGB or the like.

Figure 5:
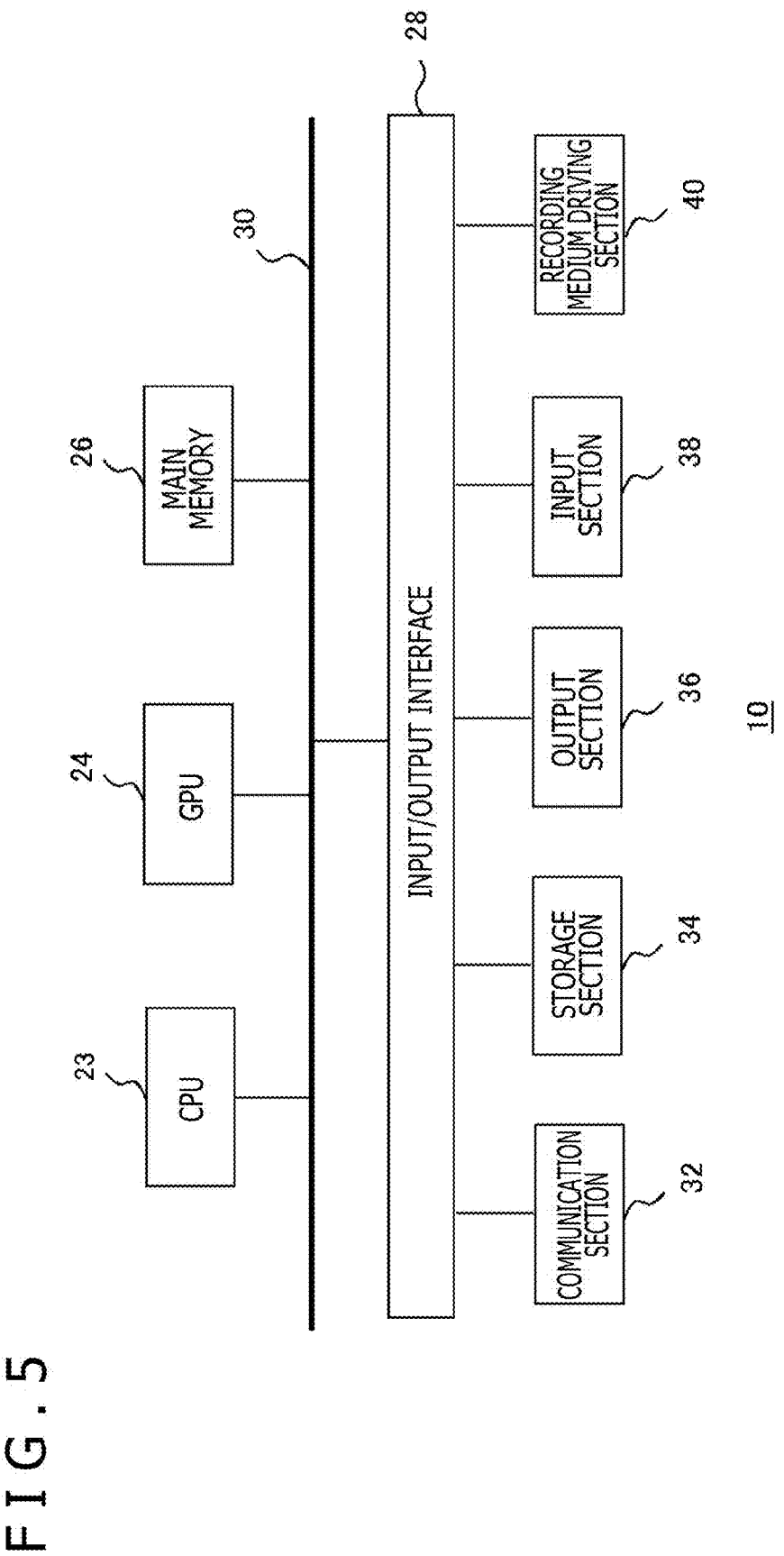
FIG. 5 is a diagram illustrating an internal circuit configuration of an image processing apparatus and display apparatus according to the present embodiment.

FIG. 5 illustrates an internal circuit configuration of the image processing apparatus 10. The image processing apparatus 10 includes a CPU (Central Processing Unit) 23, a GPU (Graphics Processing Unit) 24, and a main memory 26. Each section of the above is connected to each other through a bus 30. To the bus 30, an input/output interface 28 is further connected. To the input/output interface 28, a peripheral device interface such as a USB (Universal Serial Bus) or IEEE (Institute of Electrical and Electronics Engineers) 1394, a communication section 32 including a network interface of a wire or wireless LAN connected to the network 8 and the like, a storage section 34 such as a hard disk drive or non-volatile memory, an output section 36 that outputs data to the display apparatus 16, an input section 38 that inputs data from the input apparatus 14, and a recording medium driving section 40 that drives a removable recording medium such as a magnetic disk, an optical disk, or a semiconductor memory are connected.

The CPU 23 performs an operating system stored in the storage section 34 to thereby control the entire image processing apparatus 10. Further, the CPU 23 executes various programs read out from the removable recording medium and loaded on the main memory 26 or downloaded via the communication section 32. Further, the communication section 32 may establish communication with external apparatuses such as the server through the network 8, acquire data of electronic contents such as the moving image, and transmit data generated inside the image processing apparatus 10.

The GPU 24 has a function of a geometry engine and that of a rendering processor. Further, the GPU 24 performs drawing processing in accordance with a drawing command from the CPU 23 and stores data of the display image in a frame buffer (not illustrated). Then, the GPU 24 converts the display image stored in the frame buffer into a video signal and outputs the video signal from the output section 36 to thereby display the image on the display apparatus 16. The main memory 26 includes a RAM (Random Access Memory) and stores a program or data necessary for the processing.

Figure 6:
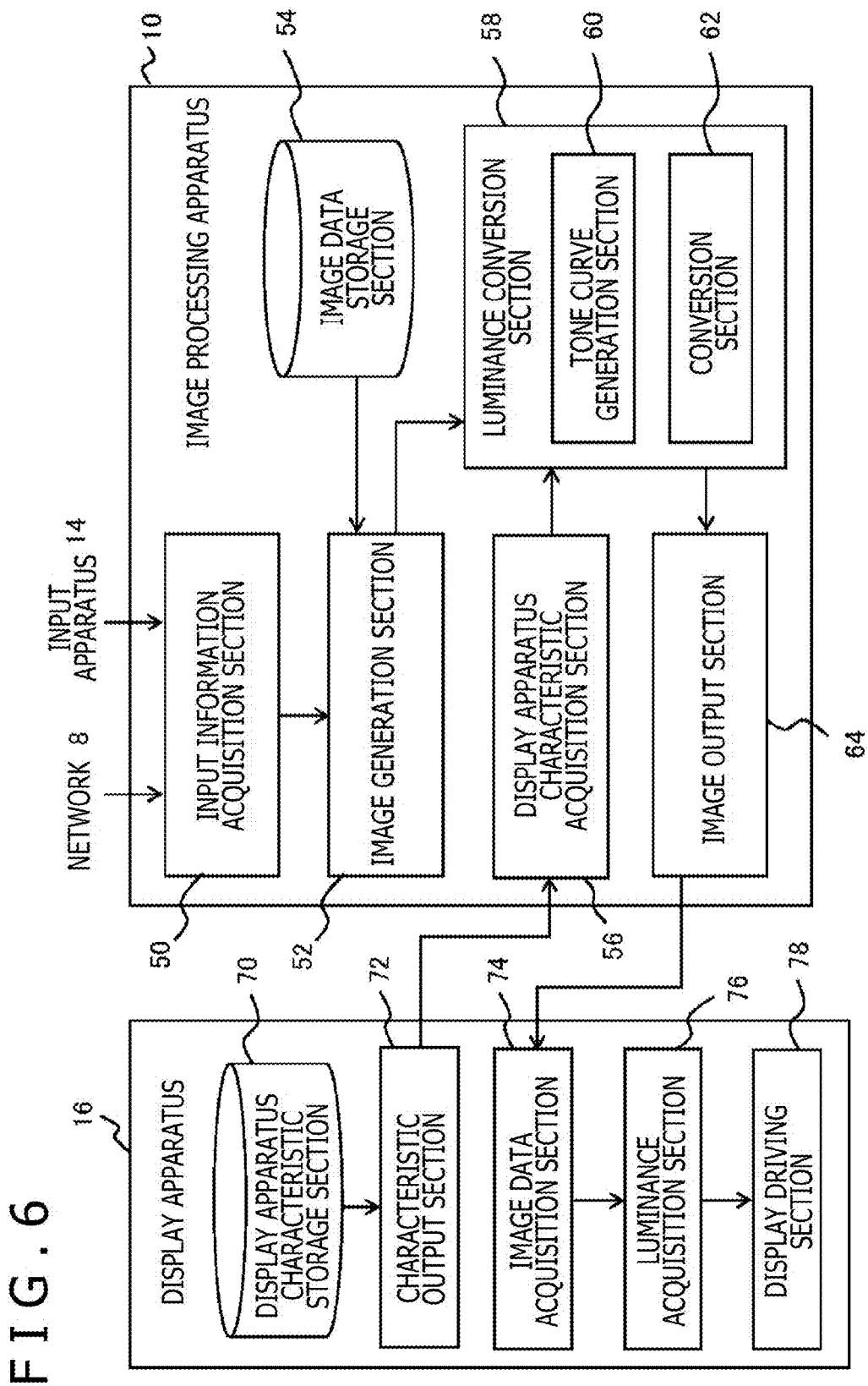
FIG. 6 is a diagram illustrating a functional block configuration of the image processing apparatus according to the present embodiment.

FIG. 6 illustrates a functional block configuration of the image processing apparatus 10 and the display apparatus 16. In terms of hardware, each functional block illustrated in the same figure and FIG. 10 described below can be implemented by using the configuration of the CPU, GPU, various memories, data bus, and the like illustrated in FIG. 5. In terms of software, each functional block can be implemented by programs for exerting the functions such as a data input function, data retention function, calculation function, image processing function, and communication function loaded into the memory from the recording medium or the like. Therefore, it will be understood by those skilled in the art that the functional blocks can be implemented in various forms including hardware alone, software alone, and a combination thereof, and are not limited to any one of them.

The image processing apparatus 10 includes an input information acquisition section 50 that acquires necessary data from the input apparatus 14 and the network 8, an image generation section 52 that generates an image, an image data storage section 54 that stores data used to generate the image, a display apparatus characteristic acquisition section 56 that acquires information regarding the linear luminance range from the display apparatus 16, a luminance conversion section 58 that performs the tone mapping as described above, and an image output section 64 that outputs data of the image to the display apparatus 16.

The input information acquisition section 50 is implemented by the input section 38, the CPU 23, and the like and acquires data indicating contents of the user operation from the input apparatus 14. Here, the user operation may be an operation performed to general content processing such as selection of application to be performed or contents to be output, start/end of the processing, and a command input to the application. When an image pickup apparatus or various sensors are introduced as the input apparatus 14, the input information acquisition section 50 may acquire data such as a photographed image or an output value from sensors.

The input information acquisition section 50 may acquire data of an electronic content such as a moving image from the server through the network 8. The input information acquisition section 50 provides the acquired data for the image generation section 52. The image generation section 52 is implemented by the CPU 23, the GPU 24, the main memory 26, and the like and generates data of the display image in accordance with information regarding the user operation, etc. acquired from the input information acquisition section 50. For example, in a case where the user selects a game, the image generation section 52 draws a game image according to the user operation, an output value from the sensors, or the like at a predetermined frame rate.

On this occasion, the image generation section 52 arbitrarily reads out a program for progressing the game, data of an object model for drawing the image, or the like from the image data storage section 54. Alternatively, the image generation section 52 may decode or elongate data of moving images or still images specified by the user. The data of the image may be data stored in the image data storage section 54 or data distributed from the server through the network 8. Alternatively, the image generation section 52 may acquire, and decode or elongate data of the image photographed by the image pickup apparatus included in the input apparatus 14. The image generation section 52 further acquire also information regarding the control luminance range corresponding to the image data.

In a mode of displaying the game image, for example, the target object desired to maintain the detail degree is specified in advance as a program of the game or additional information regarding an object model. Further, when the image frame is drawn, the image generation section 52 acquires, as information regarding the control luminance range, a range of the luminance in which the target object is represented or the maximum value thereof. In this case, through movement of the target object, a change in illuminance in the virtual space, or the like, even the control luminance range changes over time.

Alternatively, even if the target object is such a game image, the control luminance range can be fixed. For example, a change in the luminance that is assumed in the target object is acquired at a creation step of the game and the maximum luminance is set to additional information of a game program or an object model. In this case, when starting the game processing or the like, the image generation section 52 just has to read out the additional information. Note that the target serving as the control luminance range may not be a specific object.

The above object may be an area in the image specified by some sort of rule, such as a foreground area in the image, an area representing character information, or the like. Depending on conditions, regardless of contents of the image, the control luminance range may be directly specified. Alternatively, the image generation section 52 may derive the control luminance range under a predetermined rule on the basis of a position of the light source in the virtual space such as a light map and a position of the virtual screen. In this case, because the light source exists near, a natural adjustment can be performed for a luminance range of the entire image, for example, a state is avoided in which the image is extremely bright in whole and a detailed portion is hard to view or the like.

Further, in a mode of displaying an image of a separately prepared content, information regarding the control luminance range is added to data of the content and the image generation section 52 reads out the above data when starting the processing. In a case where the content is a moving image, the time change of the control luminance range may be additional information or variation over the entirety of the control luminance range is acquired and the maximum luminance in the variation may be set to the additional information. The image generation section 52 sequentially provides data of the generated image and information regarding the control luminance range for the luminance conversion section 58.

The display apparatus characteristic acquisition section 56 is implemented by the input section 38, the CPU 23, and the like and acquires the information regarding the linear luminance range from the display apparatus 16. As described above, the linear luminance range is peculiar to the display apparatus 16 and at the same time can be varied even on the basis of a luminance distribution in the displayed image, the time from light emission, or the like. In the variation of the maximum luminance of the linear luminance range caused by the above, for example, the minimum value is acquired and associated with the maximum luminance of the control luminance range. In such a case, it is assured that the linear luminance range typically includes the control luminance range. Note, however, that the present embodiment is not limited thereto; even if an average value or maximum value of the maximum luminance of the linear luminance range is associated with the maximum value of the control luminance range, the same effect can be approximately obtained.

Information regarding such a linear luminance range may be fixed in units of the display apparatus or may be changed by displayed contents or a scene in the contents. In a scene in which the image is bright in whole, for example, the linear luminance range is considered to be narrowed down due to a dark scene on the basis of a principle illustrated in FIG. 3. In accord with the above, for example, in each step of total brightness (luminance distribution) of the image, the linear luminance range is acquired at the time of displaying such an image. Further, the data with which the above are associated may be prepared as the information regarding the linear luminance range.

In this case, the luminance distribution for each content or scene is used as the additional information of content data to thereby switch the linear luminance range to be adopted on the basis of the luminance distribution. Alternatively, when the luminance distribution of the image is calculated in each frame, the image generation section 52 can switch the linear luminance range to be adopted in each frame. Note that in a case where the display apparatus 16 has a switchable display mode on the basis of the contents to be displayed such as a game mode, a cinema mode, or a dynamic mode, the linear luminance range is considered to be changed on the basis of the display mode. To solve the above problem, the linear luminance range is prepared in each display mode and the linear luminance range used in accordance with the practical display mode may be switched.

Desirably, the information regarding the linear luminance range depends on the display apparatus at any rate, and therefore is acquired in advance through the measurement. For example, the setting luminance of graphic forms with predetermined shapes and images obtained by changing an area are sequentially displayed on the display apparatus 16. Then, by measuring the display luminance, the luminance characteristics as illustrated in FIG. 3 can be acquired. A range of the setting luminance that indicates a change in a line form in the above is stored in an internal memory of the display apparatus 16 as the linear luminance range. Alternatively, the information regarding the linear luminance range obtained against various display apparatuses through similar measurements may be stored in the server associated with identification information such as a type of the display apparatus. Further, the image processing apparatus 10 may arbitrarily acquire the information through the network 8. The display apparatus 16 may retain such a database.

Note that in a case where the linear luminance range of the display apparatus 16 may not be acquired, the display apparatus characteristic acquisition section 56 may estimate the linear luminance range on the basis of the predetermined rule. For example, the database obtained by classifying, in each attribute, the information regarding the linear luminance range obtained against the various display apparatuses is stored in the internal memory. Here, the attribute of the display apparatus may include general additional information such as a maker, a size, a display method, a manufacturing date, a portion of types. Further, the linear luminance range nearest to the attribute is adopted with reference to the database on the basis of the attribute of the really connected display apparatus 16.

A database may be provided on the server and an inquiry may be enabled through the network 8 as occasion demands. Alternatively, the linear luminance range in which the range is narrowest from among the linear luminance ranges of the various display apparatuses is set to a default value. Thereby, the control luminance range may be assured to be included in the real linear luminance range.

The luminance conversion section 58 is implemented by the GPU 24, the main memory 26, and the like. The luminance conversion section 58 includes a tone curve generation section 60 that generates a tone curve representing the conversion rule for the luminance and a conversion section 62 that converts the luminance of the image. The tone curve generation section 60 generates the tone curve so as to associate the control luminance range acquired from the image generation section 52 with the linear luminance range acquired from the display apparatus characteristic acquisition section 56. When both are fixed, even the tone curve is fixed, and therefore the tone curve generation section 60 just has to initially perform processing only once. When either of both is at least controlled in each scene or sequentially, the tone curve generation section 60 sequentially generates the tone curve in accordance with the change.

The conversion section 62 converts each luminance of each color represented by a pixel value of the image generated by the image generation section 52 by using the tone curve generated as described above. The image output section 64 is implemented by the CPU 23, the GPU 24, the main memory 26, the output section 36, and the like. Further, the image output section 64 quantizes the luminance converted by the conversion section 62 by using a predetermined transfer function and outputs electronic data of the image using the quantized luminance as a pixel value to the display apparatus 16.

The display apparatus 16 includes a display apparatus characteristic storage section 70 that stores the information regarding the linear luminance range, a characteristic output section 72 that outputs the information regarding the linear luminance range to the image processing apparatus 10, an image data acquisition section 74 that acquires the image data of contents from the image processing apparatus 10, a luminance acquisition section 76 that converts information regarding an electric signal of the image data into a luminance value, and a display driving section 78 that drives a display by the luminance after the conversion.

The display apparatus characteristic storage section 70 stores the information regarding the linear luminance range acquired against the display apparatus 16 itself or a plurality of display apparatuses including other display apparatuses. In accordance with the inquiry, etc. from the image processing apparatus 10, the characteristic output section 72 reads out the information regarding the linear luminance range from the display apparatus characteristic storage section 70 and outputs the above information to the image processing apparatus 10. The image data acquisition section 74 acquires data of the image frame from the image processing apparatus 10. As described above, the data is electronic data obtained by quantizing the luminance after the tone mapping.

The luminance acquisition section 76 inverse-quantizes data of the image frame to thereby acquire the setting luminance of each pixel. The display driving section 78 drives the display at a voltage based on the luminance after the conversion to thereby display the image. A relationship between the setting luminance and the output luminance at this time is as illustrated in FIG. 3. Further, the control luminance range is present within the linear luminance range, and thereby it is assured that a key point is represented with the detail degree intended at the initial time.

Figure 7:
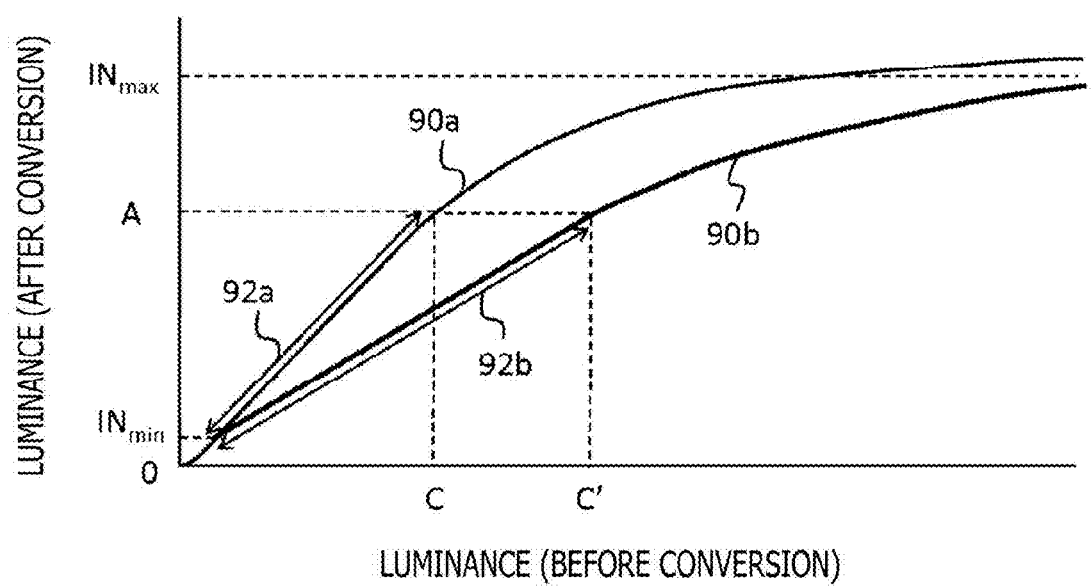
FIG. 7 is a diagram illustrating a tone curve generated by a tone curve generation section according to the present embodiment.

FIG. 7 illustrates the tone curves generated by the tone curve generation section 60. In the above, tone curves 90a and 90b illustrated in FIG. 7 are generated at the time of implementing the conversion illustrated in FIGS. 4A and 4B, respectively. The tone curve is really defined as a function in each range of the luminance. Alternatively, the tone curve may be defined by using a lookup table, etc. in which discrete luminances before and after the conversion are associated with each other. In the tone curves 90a and 90b, maximum luminances C and C' in the control luminance range are converted into a maximum luminance A in the liner luminance range of the display apparatus 16 as illustrated in FIGS. 4A and 4B. At the same time, the tone curves 90a and 90b include areas 92a and 92b in which the luminances equal to or smaller than the maximum luminances A, C and C' are converted linearly.

Note that in a PQ (Perceptual Quantization) method in which the luminance is specified with an absolute value against the display apparatus, a minimum luminance IN min and a maximum luminance IN max that correspond to a luminance range capable of an output in the display apparatus 16 are defined against the luminance after the conversion as illustrated in the figure. In an HLG (Hybrid Log-Gamma) method in which the luminance is specified with a relative value, the luminance after the conversion is varied between 0 and 1. The luminance in the control luminance range is converted into the luminance in the linear luminance range with a linear function in which the gradient is positive. Thereby, the target necessary to be represented in detail can be represented in a state near to an intention of an image creator. Further, even if the luminance representing the target is increased depending on conditions in the image, the gradient of the linear function is adjusted like a change from the area 92a to the area 92b. This process permits loss of the detail degree in the display to be suppressed.

Note that a variation of the tone curves illustrated in the figure is one example. As described above, in the control luminance range, the maximum luminances C and C' may be fixed by setting the maximum luminance in accord with all conditions. Further, the maximum luminance A may be varied in accordance with the conditions in the linear luminance ranges. Further, as indicated in the tone curves 90a and 90b, in the luminance area that is higher than the areas 92a and 92b in the luminance, a curved line is represented in which the gradient is eventually decreased in a form corresponding to the maximum output luminance, a transfer function method of the display apparatus 16, or the like. A function that represents the curved line is not particularly limited and further a function that a plurality of straight lines are connected may be used regardless of the curved line. Thereby, in the key point, the high-luminance portion is capable of a dynamic representation using the luminance range capable of an output in the display apparatus while suppressing loss of the detail degree.

Figure 8:
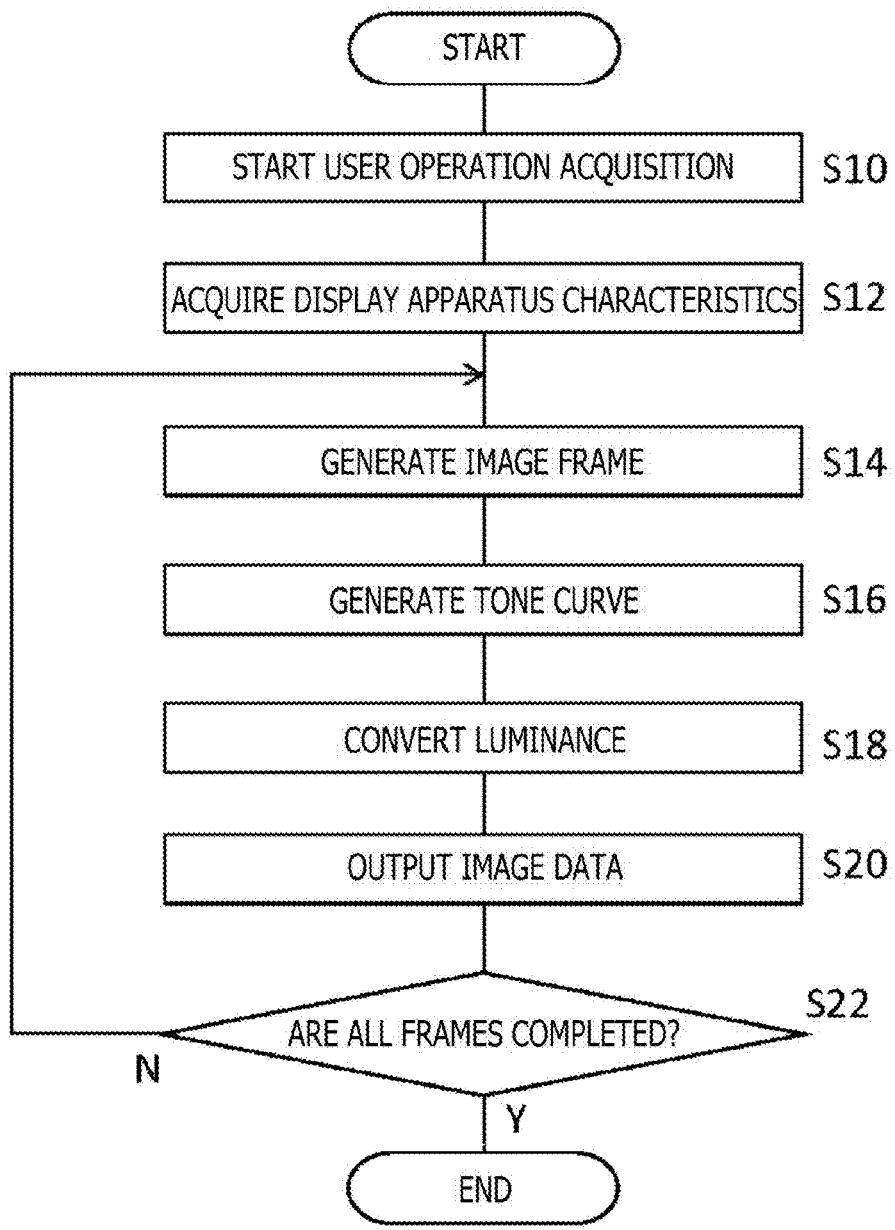
FIG. 8 is a flowchart illustrating a processing procedure in which the image processing apparatus according to the present embodiment generates image data and outputs the image data to the display apparatus.

Next, operations of the image processing apparatus 10 implemented by the configuration described heretofore will be described. FIG. 8 is a flowchart indicating a processing procedure in which the image processing apparatus 10 according to the present embodiment generates the image data and outputs the image data to the display apparatus. First, the input information acquisition section 50 starts acquiring information regarding the user operation such as a content selection (S10). Next, the display apparatus characteristic acquisition section 56 acquires characteristics of the display apparatus 16, that is, the information regarding the linear luminance range from the display apparatus 16 connected as an output destination of the image data (S12). Note that as described above, the information may be acquired from the server (not illustrated) connected through the network 8.

Next, the image generation section 52 arbitrarily processes the contents specified in S10 and draws or decodes the image frame for generation (S14). Continuously, the tone curve generation section 60 of the luminance conversion section 58 generates the tone curve such that the control luminance range in the image, which is given as additional information of the original image data or the program, is associated with the linear luminance range of the display apparatus 16, which is acquired in S12 (S16).

Note that in a case where the linear luminance range is changed in each image frame, the image generation section 52 extracts the maximum luminance in the image frame, of the target desired to maintain the detail degree. Thereby, the image generation section 52 may generate the information regarding the linear luminance range in the processing of S14. Further, the image generation section 52 once normalizes the luminance determined in the floating point with the maximum luminance defined as 1 in the linear luminance range. Thereby, the image generation section 52 may include the information regarding the linear luminance range in the image data itself. In this case, a value of C (or C') in the horizontal axis illustrated in FIG. 7 is 1. At this time, the tone curve generation section 60 prepares, for example, the tone curve such that an area of the luminance equal to or smaller than 1 is surrounded by a straight line and an area of the luminance larger than 1 is surrounded by the curved line.

The conversion section 62 of the luminance conversion section 58 converts the luminance of the image generated in S14 by using the tone curve generated in S16 (S18). Continuously, the image output section 64 quantizes the luminance after the conversion by using the predetermined transfer function and outputs the quantized luminance as an electric signal for each pixel or for each color to the display apparatus 16 (S20). If the output of all frames is not completed (N in S22), the processes from S14 to S20 are repeated in the next image frame. In the display apparatus, the luminance is acquired and output in each pixel by general processing. Thereby, the video is displayed by an appropriate luminance assignment in each frame. If the output of all the frames to be displayed is completed, the process ends (Y in S22).

Figure 9A:
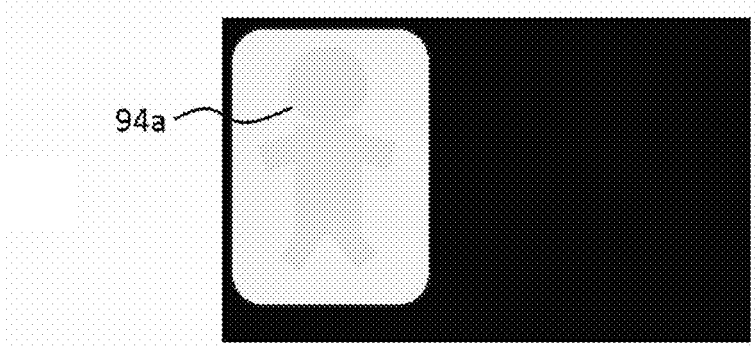
FIGS. 9A and 9B are diagrams describing a change in an image caused by the present embodiment.
Figure 9B:
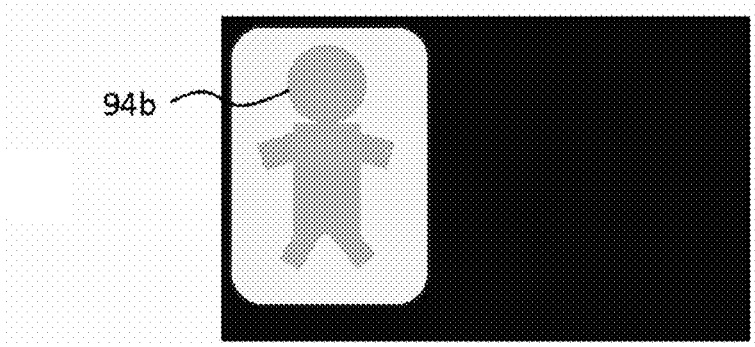

FIGS. 9A and 9B are diagrams illustrating a change in the image caused by the present embodiment. FIG. 9A schematically illustrates an example of the image by an existing tone mapping and FIG. 9B schematically illustrates an example of the image by the tone mapping according to the present embodiment. For example, there is assumed a scene such that in a relatively dark virtual space, enemy objects 94a and 94b exist in a portion of location irradiated with strong light. In the existing tone mapping, the tone curve is adjusted in accordance with the minimum luminance, maximum luminance, average luminance, or the like of the image. However, in a case where the dynamic range in the display is large as illustrated in this example, the enemy object 94a is classified into the high-luminance area in the result and easily becomes an adjustment object of the gradation compression or the output luminance.

In the result, it is considered that as illustrated in the FIG. 9A, the image is assimilated into a space that is bright in the surrounding, the enemy object 94a is hard to view, and the visibility depends on the display apparatus. According to the present embodiment, when the luminance of the enemy object 94b is converted so as to fall within the linear luminance range of the display apparatus, a gradation difference between the relatively dark virtual space and the space that is bright in the surrounding is maintained. The enemy object 94b can be stably displayed and at the same time a dynamic range of the entire image is maintained.

Figure 10:
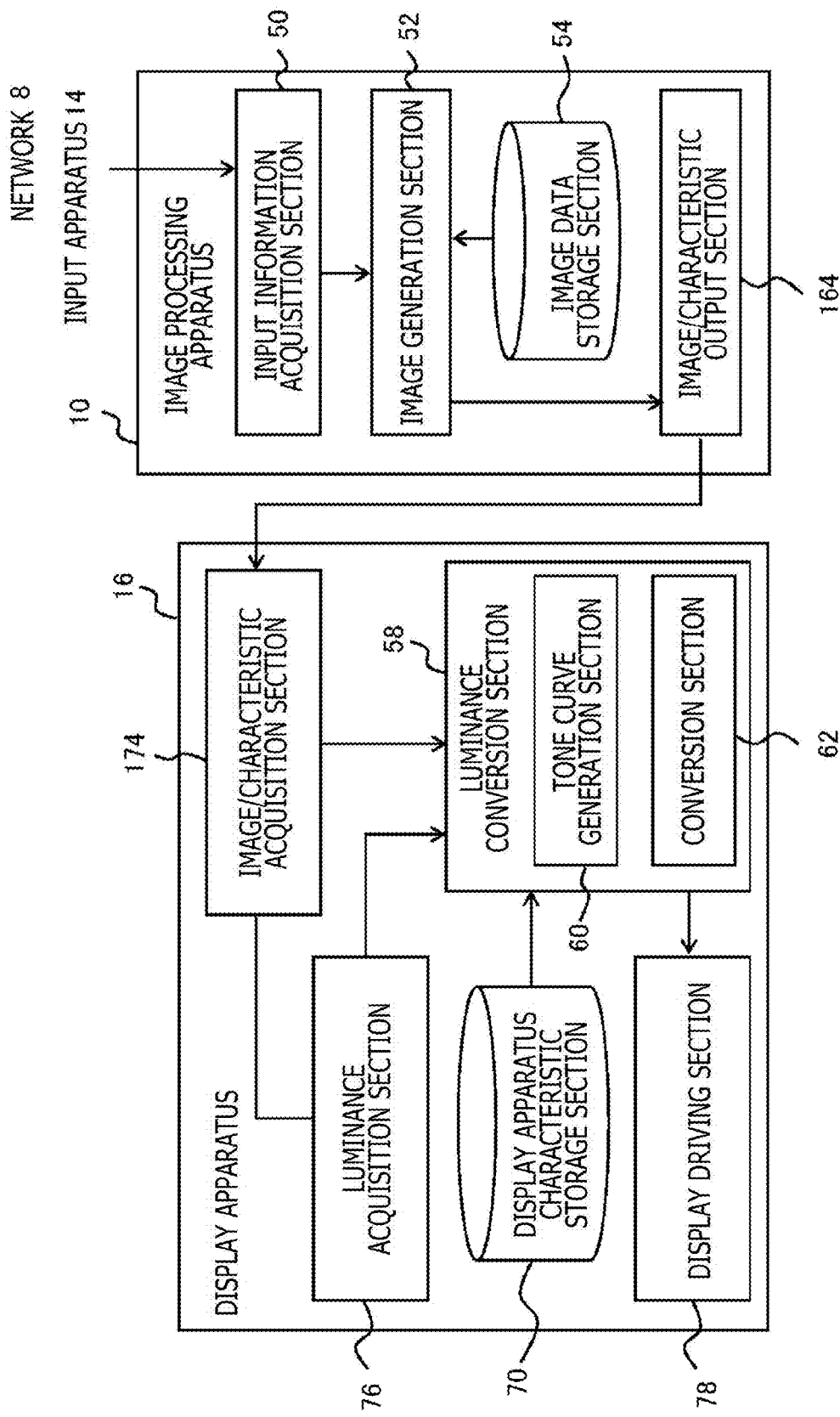
FIG. 10 is a diagram illustrating a functional block configuration of the display apparatus and the image processing apparatus having a function of the luminance conversion according to the present embodiment.

In the mode described heretofore, there is described an example in which the image processing apparatus 10 that generates an image appropriately converts the luminance in accordance with characteristics of the display apparatus. Further, even if the same function is provided on the display apparatus side, the same effect is obtained. Also, the configuration of the system in this case may be similar to that illustrated in FIG. 1. FIG. 10 illustrates a functional block configuration of the display apparatus 16 and image processing apparatus 10 having a function of the luminance conversion. In the same figure, the same symbol is given to a block having the same function as that of the functional block illustrated in FIG. 6 and the descriptions are arbitrarily omitted.

The image processing apparatus 10 includes an input information acquisition section 50 that acquires necessary data from the input apparatus 14 or the network 8, an image generation section 52 that generates an image, an image data storage section 54 that stores data used to generate the image, and an image/characteristic output section 164 that outputs data of the image frame and the information regarding the control luminance range to the display apparatus 16.

The input information acquisition section 50, the image generation section 52, and the image data storage section 54 have the same function as that of a corresponding functional block illustrated in FIG. 6. The image/characteristic output section 164 outputs data of the image frame generated by the image generation section 52 and the information regarding the control luminance range in the image to the display apparatus 16. In the present embodiment, in order to perform conversion of the luminance range in the display apparatus 16, data of the image output by the image/characteristic output section 164 may include, for example, data obtained by quantizing the luminance indicated by 16-bit floating point. Further, a procedure for acquiring the control luminance range against the image frame, contents, or the like is in the same manner as in the case illustrated in FIG. 6.

The display apparatus 16 includes an image/characteristic acquisition section 174 that acquires the image data of contents and the information regarding the control luminance range from the image processing apparatus 10, a luminance acquisition section 76 that converts information regarding an electric signal of the image data into a value of the luminance, a luminance conversion section 58 that converts the luminance of the image so that the linear luminance range and the control luminance range correspond to each other, a display apparatus characteristic storage section 70 that stores the information regarding the linear luminance range, and a display driving section 78 that drives the display in the luminance after the conversion.

The image/characteristic acquisition section 174 acquires data of the image frame of contents and the information regarding the control luminance range from the image processing apparatus 10. Note that in a case where the information regarding the control luminance range is fixed regardless of the image frame, the information just has to be added to only a first frame. The luminance acquisition section 76, the display apparatus characteristic storage section 70, and the luminance conversion section 58 have the same function as that of the corresponding functional block illustrated in FIG. 6.

Note, however, that the luminance conversion section 58 acquires the information regarding the control luminance range in the image from the image/characteristic acquisition section 174. Further, the information regarding the linear luminance range is read out from the display apparatus characteristic storage section 70. Then, the tone curve generation section 60 prepares the tone curve so that the luminance ranges are associated with each other. Further, the conversion section 62 converts the luminance for each pixel acquired by the luminance acquisition section 76 by using the tone curve. The display driving section 78 drives the display at a voltage based on the luminance after the conversion to thereby display the image. Even in such a configuration, the display can be implemented with the detail degree maintained regardless of conditions in a necessary portion of the image.

According to the present embodiment described above, a target desired to maintain and display the detail degree regardless of conditions in the image is definitized in advance. Further, on the basis of the information and the luminance characteristics in the display apparatus, the conversion rule is determined and then the luminance conversion is performed in accordance with the luminance range capable of an output in the display apparatus. More specifically, the tone curve is generated and the tone mapping is performed so that the luminance of the target desired to maintain the detail degree falls within the upper limit luminance or smaller in which the display apparatus can perform an output proportional to the setting luminance. Through this process, even if the target desired to be represented in detail moves in the virtual space or the virtual space itself is changed and the target needs to be represented at high luminance, deterioration of the visibility due to compression of the gradation can be suppressed.

Further, in such a high-luminance area, the output luminance is easy to change due to control peculiar to the display apparatus, the luminance distribution of the image, or the like. The tone curve for use in the luminance conversion is determined in consideration of the luminance characteristics of individual display apparatus or conditions of the image to thereby stabilize output results. In the result, while avoiding a problem such that even in the same game content, a vision is different depending on the display apparatus and feeling of unfairness is given to players, a powerful image that is defined in a wide luminance space such as an HDR can be stably displayed.

Thus, an embodiment of the present disclosure has been described above. It should be understood by those skilled in the art that the above embodiment is illustrative, that the combination of components and processes can be modified in various ways, and that such modification examples also fall within the scope of the present disclosure.

The present disclosure contains subject matter related to that disclosed in Japanese Priority Patent Application JP 2017-213720 filed in the Japan Patent Office on Nov. 6, 2017, the entire content of which is hereby incorporated by reference.

What is claimed is:

1. An image processing apparatus comprising:
   an image data acquisition section configured to acquire data of an image;
   a luminance conversion section configured to convert a luminance range of the image to a display image having an output luminance range using a conversion rule, wherein the conversion is for a same dynamic range; and
an output section configured to output the display image to a display, wherein
wherein an output luminance range of the display is proportional to the output luminance range until a maximum luminance value, and
wherein the conversion rule is linear until the maximum luminance value.

2. The image processing apparatus according to claim 1, wherein
the luminance conversion section determines the conversion rule so that a luminance range of a control target does not exceed the maximum luminance value.

3. The image processing apparatus according to claim 2, wherein
the luminance conversion section sets the maximum luminance value to be a maximum luminance of the control target.

4. The image processing apparatus according to claim 2, wherein
the luminance conversion section determines the conversion rule with a maximum value of the luminance of a particular object set to the image being defined as a maximum luminance of the luminance range of the control target.

5. The image processing apparatus according to claim 4, wherein
the luminance conversion section determines the conversion rule in each of image frames with the maximum value of the luminance of the particular object, which is acquired in the each image frame composing a moving image, being defined as the maximum luminance of the luminance range of the control target.

6. The image processing apparatus according to claim 4, wherein
the luminance conversion section determines the conversion rule in each scene with the maximum value of the luminance of the particular object, which is acquired in each of the scenes of the moving image, being defined as the maximum luminance of the luminance range of the control target.

7. The image processing apparatus according to claim 1, further comprising
a display apparatus characteristic acquisition section configured to acquire the maximum luminance value for the display device from a server that stores the maximum luminance value for a plurality of display device.

8. The image processing apparatus according to claim 1, wherein
a maximum luminance of the display image does not exceed the maximum luminance value.

9. A display apparatus comprising:
a characteristic output section configured to determine a maximum luminance value which is a maximum luminance value of the display device that is proportional to an output luminance range of an image;
an image data acquisition section configured to convert the image to a display image using a conversion rule,
wherein the image and the display image have a same dynamic range; and
a display section configured to display the display image,
wherein a maximum luminance of the display image does not exceed the maximum luminance value.

10. An image processing method executed by an image processing apparatus, comprising:
acquiring data of an image;
converting a luminance range of the image to a display image having an output luminance range using a conversion rule,
wherein the conversion is for a same dynamic range; and
outputting the data of the display image to a display, wherein
wherein an output luminance range of the display is proportional to the output luminance range until a maximum luminance value, and
wherein the conversion rule is linear until the maximum luminance value.

11. A non-transitory computer readable information storage medium storing a program which is to be executed by a computer, the program including instructions for:
acquiring data of an image;
converting a luminance range of the image to a display image having an output luminance range using a conversion rule,
wherein the conversion is for a same dynamic range; and
outputting the data of the display image to a display, wherein
wherein an output luminance range of the display is proportional to the output luminance range until a maximum luminance value, and
wherein the conversion rule is linear until the maximum luminance value.

* * * * *